United States Patent
Hsing

(10) Patent No.: US 8,977,089 B2
(45) Date of Patent: Mar. 10, 2015

(54) CABLE CONNECTION HOUSING PROVIDING MULTIPLE METHODS FOR WATERPROOFING MAIN CABLES

(75) Inventor: Chih-Kuang Hsing, New Taipei (TW)

(73) Assignee: Yu-Fen Chi (TW)

( * ) Notice: Subject to any disclaimer, the term of this patent is extended or adjusted under 35 U.S.C. 154(b) by 419 days.

(21) Appl. No.: 13/319,195

(22) PCT Filed: May 6, 2009

(86) PCT No.: PCT/CN2009/071664
§ 371 (c)(1),
(2), (4) Date: Jan. 24, 2012

(87) PCT Pub. No.: WO2010/127486
PCT Pub. Date: Nov. 11, 2010

(65) Prior Publication Data
US 2012/0121228 A1    May 17, 2012

(51) Int. Cl.
*G02B 6/44* (2006.01)
*G02B 6/00* (2006.01)
*H02G 15/013* (2006.01)
*H02G 15/007* (2006.01)
*H02G 15/06* (2006.01)

(52) U.S. Cl.
CPC .......... *H02G 15/013* (2013.01); *H02G 15/007* (2013.01); *H02G 15/06* (2013.01)
USPC ............. 385/100; 385/135; 174/84 R; 174/92

(58) Field of Classification Search
USPC ............ 385/100–109, 135–139, 147; 174/92, 174/84 R
See application file for complete search history.

(56) References Cited

U.S. PATENT DOCUMENTS

| | | | | |
|---|---|---|---|---|
| 3,992,569 A | * | 11/1976 | Hankins et al. | 174/92 |
| 4,504,699 A | * | 3/1985 | Dones et al. | 174/84 R |
| 8,412,016 B2 | * | 4/2013 | Hsing | 385/135 |
| 2012/0093472 A1 | * | 4/2012 | Hsing | 385/135 |

FOREIGN PATENT DOCUMENTS

| | | |
|---|---|---|
| CN | 2403158 | 10/2000 |
| CN | 2411609 | 12/2000 |
| CN | 2446701 Y | 9/2001 |
| CN | 201061108 | 5/2008 |
| JP | 9294321 | 11/1997 |

OTHER PUBLICATIONS

Chinese Office Action, Chinese Patent Application CN200910302126.3, Aug. 27, 2012, 5 pp.

* cited by examiner

*Primary Examiner* — Akm Enayet Ullah
(74) *Attorney, Agent, or Firm* — Volpe and Koenig, P.C.

(57) ABSTRACT

The present invention relates to a communication cable splice box that is capable of different ways to waterproof the main cable, the cable splice box comprises a protective cover and at least a cable entry place, the cable entry space has at least three hollow cylindrical columns, one of the hollow cylindrical columns can provide entry for two main cables that are preparing for heat shrink tube waterproofing into the cable splice box, the two remaining hollow cylindrical columns each provides entry for one main cable that is preparing for elastic rubber shrinkable pipe waterproofing into the cable splice box. This can improve in the prior art and solve the array of waterproofing problems encountered in the entry opening of the main cable of the telecommunication cable splice box.

21 Claims, 11 Drawing Sheets

US 8,977,089 B2

CABLE CONNECTION HOUSING PROVIDING MULTIPLE METHODS FOR WATERPROOFING MAIN CABLES

CROSS REFERENCE TO RELATED APPLICATION(S)

The application claims the benefit of the International Patent Application No. PCT/CN2009/071664, filed on May 6, 2009, in the World Intellectual Property Office, which is incorporated by reference as if fully set forth herein.

FIELD OF INVENTION

The present invention relates to a cable splice box that can utilize different ways to carry out the waterproofing of the main cable, the cable splice box includes a protective cover and at least a cable entry space, the cable entry space has at least three hollow cylindrical columns, wherein one of the hollow cylindrical column provides entry for two main cables that are preparing for heat shrink waterproofing into the cable splice box, the other two remaining hollow cylindrical columns each provides entry for one main cable that is preparing for elastic rubber shrinkable pipe waterproofing into the cable splice box. In particular, while used in either straight splicing operation or branch splicing operation, there is no need for tools, fire source, and with simple and safe construction, and used elastic rubber shrinkable pipe mechanism to carry out the waterproofing of the main cable penetrating the cable splice box. When encountering mid-span branch splicing, there is no need to switch to using heat shrink cable splice box, and can use the heat shrink tube to waterproof the main cable penetrating the cable splice box. This can improve the cable splice box of the prior art, where the main cable entry opening mechanism can provide only heat shrink mechanism or elastic rubber shrinkable pipe mechanism of waterproofing of the main cable, not both, leading to higher costs of telecommunication enterprises and a rise in the dangers of construction.

BACKGROUND

As cables laying around the world are seeking to be situated underground as much as possible, and this chiefly relies on the network of pipelines. The cable splice boxes that connect cables underground are situated in the manholes and hand-holes of underground cable pipelines, and many manholes and hand-holes accumulate huge amounts of water yearly, thus the cable splice boxes situated within these holes are immersed in water yearlong. Please refer to FIG. 1, as a cross-section of the underground network of cable splice boxes. In FIG. 1, man hole covers 11, 12 have man holes 111, 121 installed beneath them, man holes 111, 121 have cable splice boxes 13, 14 disposed in them, cable splice boxes 13 and 14 are connected by cable 14, cable splice boxes 13, 14 are further connected with other cable splice boxes with cables 15, 17 (not shown). In practice, cables 15, 16, 17 are curled up in man holes 111, 121. Regardless of whether a cable splice box is made with an electric cable or a optical fiber cable, if there is insufficient waterproofing, water leaking into cable splice boxes due to water built up from manholes or hand-holes will affect the transmission quality of the cable in addition to accelerating the deterioration of the cable, resulting in transmission malfunctions and reducing the lifespan of cables.

Existing technology of optical fiber cable networking and splicing techniques, in telecommunications, cable television, monitoring systems and other types of cable transmission industries, has long relied on heat shrink cable splice boxes. Although the manufacturing cost for a heat shrink cable splice box is comparatively lower, the cable has a longer applicable outer diameter, along with faster and simpler construction, thus being widely used in the industry, the heat shrink cable splice box is heavily criticized for its common water leakage problems. During the torching of the heat shrink tube of the first cable entry opening to waterproof the opening in a heat shrink cable splice box, and when torching heat shrink tubes of other cable entry openings on the optical fiber cable entry place, neighboring heat shrink pipes that are already torched are subjected to further heating, therefore they soften, loosen and causes water leakage in cable splice box. Please refer to FIG. 2(A), for a vertical view of the practical technology of a heat shrink cable box. In FIG. 2(A), heat shrink cable splice box 20 (abbreviated as splice box) has cables entering and exiting entry opening 21, there are hollow cylindrical columns 22, 23A, 23B, 23C, 23D, 23E, the hollow cylindrical columns 22, 23A-23E are sealed before cables are introduced, when cables are ready to penetrate, they can be opened through sawing or hammering, etc. Main cables 24A, 24B go through hollow cylindrical column 22 into splice box 20, the main cables 24A, 24B are separated by branch clip 29 using heat shrink pipes. Branch cables 25A, 25B, 25C, 25D, 25E, respectively, go through hollow cylindrical columns 23A~23E to enter splice box 20. Please refer to FIGS. 2(B) and (C) which are schematic diagrams illustrating the technology of the structure of waterproofing heat shrink cable splice boxes. In FIGS. 2(B) and (C), heat shrink cable splice box 30 (abbreviated as splice box) is constructed with at least protective cover 22, cable entering and exiting entry opening 31 and hollow cylindrical columns 32, 33A, 33B. The user first takes main cables 24A and 24B to penetrate hollow cylindrical column 32 that is wrapped by heat shrink tube 36, through opening 38A into the splice box; main cables 24A and 24B are divided by a manifold clip used by heat shrink pipes, then heat shrink tube 36 and manifold clip are torched with fire, finishing the waterproofing of the cable entry opening whereby main cables 24A and 24B goes through. The branch cable 35B penetrates hollow cylindrical column 33B that is wrapped by heat shrink tube 37, through opening 38B into the splice box, then heat shrink pipe 33B is torched, in order to complete the waterproofing of the entry opening where the branch cable 35B enters and exits. The main cables 24A, 24B and branch cable 35B have their spliced point stored in the cable splicing distribution plate 39. However, when torching the heat shrink pipe 37, the already torched heat shrink pipe 36 being nearby heat shrink tube 37 is subjected to further heating, thus softens, loosens and causes water leakage in splice box 30. Similarly, during the torching of other heat shrink tubes of cable entry opening 33A, neighboring heat shrink pipes that are already torched are subjected to further heating, therefore they soften, loosen and cause water leakage in splice box 30.

Using optical fiber splice box as example, the cable entry place of a telecommunication optical fiber splice box has a diameter usually 15 cm to 20 cm or even smaller, while the cable entry place usually is required to a provide access for 2 main optical fiber cables and 4 branch optical fiber cables or more, so every optical fiber opening is very close to the other, on the cable entry place. Therefore, in the current technology that uses heat shrink tubes to waterproof optical fiber cable entry openings of the heat shrink cable splice box, one has to complete torching the heat shrink tube of the first optical fiber cable entry opening, and then torch heat shrink tubes of other optical fiber cable entry openings, on top of the optical fiber entry place. This often results in heat shrink tubes that are already completed to be subjected to further torching, causing them to soften, loosen and resulting in water leakage problems in splice boxes. This shortcoming and vital flaw has always been the most pressing and difficult problem that needs to be solved, in the technological field.

Taiwan's telecommunications industry, for example, due to the popularity and trend of fiber-optic broadband service, Chunghwa Telecom in recent years laid out fiber-optic cables on a massive scale and heavily utilizes fiber-optic cable splice boxes, and also announced that beginning in 2009, for five consecutive years, will invest 30 billion a year, a total of NT $150 billion of funds for fiber-optic network infrastructure. In recent years, the company placed heat shrink optical fiber cable splice boxes in manholes and hand-holes, with far more than half of them suffering from serious leakage. As the water leakage problem in heat shrink optical fiber cable splice box is not resolved, the company has had to purchase mechanical optical fiber cable splice boxes that are 3 times more expensive than heat shrink optical fiber cable splice boxes, and a variety of mechanical means of sealing to establish a waterproof structure for optical fiber cable entry openings. The suitable optical fiber cable outer diameters for these waterproof optical fiber cable entry openings is restrictively small, accessories needed are diverse and complicated, with cumbersome construction procedures, needing a variety of tools, resulting in inconvenience and higher costs of construction, among other issues. Mechanical optical fiber cable splice boxes, in addition to being less straightforward and efficient than heat shrink optical fiber cable splice boxes, the procurement costs have increased threefold. Thus, by eliminating the shortcomings and improving the waterproofing capacity of heat shrink optical fiber cable splice devices, not only can communication quality issues due to water leakage in heat shrink optical fiber splice boxes be avoided, it also can significantly reduce the cost of investing enterprises.

Although the applicant can use elastic rubber shrinkable pipe to replace heat shrink tube, in order to solve the problems caused by torching to waterproof the optical fiber cable entry opening in heat shrink optical fiber cable splice boxes. When torching other optical fiber cable openings of heat shrink tubes, it often results in heat shrink tubes that are already completed to be subjected to further torching, causing them to soften, loosen and resulting in water leakage problems in splice boxes. However, the elastic rubber shrinkable pipe is suitable for only one optical fiber cable penetrating one entry opening, to waterproof main optical fiber cables and branch optical fiber cables which are cut and introduced into the optical fiber splice box during straight splicing or branch splicing where. It is unable, in the situation of mid-span splicing there are two optical fiber cables entering and exiting a optical fiber cable entry opening, to simultaneously and effectively waterproof the depression between two main optical fiber cables. Please refer to FIG. 3(A), because the elastic rubber tube system is a highly elastic and ductile hollow synthetic rubber tube 41, and the rubber tube's hollow walls are first installed with flexible and hard rubber strip 42, with hollow screw-like tube configuration coiled in the rubber tube and stretches the rubber tube 41's hollow diameter. When rubber strip 42 situated in rubber tube 41 is extracted, the rubber tube 41, which is stretched by rubber strip 42, results in elastic contraction of its hollow diameter, almost returning the smaller diameter before being stretched by rubber strip 42. Please refer to FIG. 3(B), wherein the cables 54, 55 in the cable entry opening's hollow cylindrical columns 52, 53 of the cable entry place 51, using elastic rubber shrinkable pipe 56 which shrinks and tight contracts, enveloping the exteriors of the hollow cylindrical columns 52, 53 and a portion of cables 54, 55 that have not penetrated the hollow cylindrical tube, forming a waterproof structure.

The majority of early optical fiber cables only carry out straight splicing and branch splicing, the main optical fiber cables are cut first before introduced into the optical fiber cable splice box to carry out splicing. Every main optical fiber cable entry opening, in the optical fiber cable entry place of the optical fiber splice box, only encompasses a main optical fiber cable. There are no problems in using elastic rubber shrinkable pipe instead of heat shrink tube to carry out waterproofing of main optical fiber cables and branch optical fiber cables that are introduced into the optical fiber cable splice box after being cut; due to the advent of FTTH (fiber to the home), many main optical fiber cables presently used in telecommunication must be introduced into optical fiber cable splice boxes under the condition that they are not cut. Whereas the unused optical fiber cables are branch spliced for the usage of other customers, this mode of operation is called mid-span connecting branch splicing. In using elastic rubber shrinkable pipe to waterproof the optical fiber cable splice box, due to the inability to effectively carry out waterproofing of the main optical fiber cables which go through mid-span connecting branch splicing, when encountering mid-span connecting splicing, there is only the choice of mechanical cable optical fiber splice box or heat shrink optical fiber cable splice box, whereby the disadvantages of using mechanical cable optical fiber splice box have already been mentioned before. Therefore the other choice, please refer to FIG. 2(B), is to switch to using the heat shrink optical fiber cable splice box 30, which allows the penetration of main cables 24A, 24B into main optical fiber cable opening 32 and is waterproofed by heat shrink tube 36.

In the realm of practical technology, the installation of the main optical fiber cable entry opening of a optical fiber cable splice box, can only provide only either heat shrink tube mechanism or elastic rubber shrinkable tube mechanism as a way of waterproofing the main cable. In the process of establishing the cable network of FFTH, because of the innumerable variables encountered in whether to execute mid-span connecting branch splicing operations. This difficulty in estimation results in persisting problems among telecommunication enterprises; there's question in how much to purchase and how many in the inventory can proceed with mid-span connecting branch splice box, and how much to purchase and how many in the inventory to not proceed with mid-span connecting branch splice box. In the event if only heat shrink optical fiber cable splice boxes were chosen, it solves the problems of purchasing, rise in cost due to diversified inventory, work distribution and complexities regarding the utilization of materials by workers. However in regards to the problem of waterproofing the main optical fiber cable, it exponentially raises safety issues that can be prevented by not using a fire source, and it defeats the safety goal of telecommunication enterprises to minimize and lower the frequency of fire usage during construction.

Therefore, the applicant in view of the shortcomings and defects arising from the lack of technology, after detailed research and careful deliberation, along with a spirit of perseverance, finally arrived at the present invention "A cable splice box that utilizes different ways to carry out waterproofing of the main cable", the following is a brief explanation of the case.

SUMMARY OF THE INVENTION

In order to overcome the shortcomings of current technology, the present invention aims to provide a cable splice box that utilizes different ways to carry out waterproofing of the main cable, the cable splice box includes a protective cover and at least a cable penetrating the entry space, the cable penetrating the entry space has at least three hollow cylindrical columns, at least one hollow cylindrical column provides entry for two main cables that are preparing for heat shrink waterproofing into the cable splice box, the two remaining hollow cylindrical columns each provides entry for one main cable that is preparing for elastic rubber shrinkable pipe waterproofing into the cable splice box. This can improve on the current technology of cable splice box, where the main cable entry opening mechanism can provide only heat shrink mechanism or elastic rubber shrinkable pipe mechanism of waterproofing of the main cable, not both, leading to higher costs of telecommunication enterprises and a rise in the dangers of construction.

The present invention, which utilizes different ways to waterproof the main cable of the cable splice box, is developed after a thorough research into the drawbacks and their causes in the current technology of heat shrink cable splice box and cable splice box with a waterproof elastic rubber shrinkable pipe. It is discovered that the main cable entry opening of the cable entry space of the heat shrink cable splice box, although can allow 2 main cables to penetrate and waterproof them using heat shrink tube, and satisfy the needs of straight splicing, branch splicing and mid-span connecting branch splicing, but torching is required in waterproofing with the heat shrink tube, significantly raising safety problems that can be avoided in the first place with straight splicing and branch splicing, defeating the safety goal of telecommunication enterprises to minimize and reduce the frequency of fire usage during construction. Whereas using elastic rubber shrinkable pipe instead of heat shrink tube to carry out waterproofing treatment, although it can satisfy the operational needs of straight splicing and branch splicing, and without the need for fire, and can satisfy the safety goal of telecommunication enterprises to minimize and lower the frequency of fire usage during construction. However, it is unable to satisfy the operational need of mid-span connecting branch splicing. This is because when waterproofing with elastic rubber shrinkable pipe, there can only be one cut main cable that penetrates the main cable entry opening of the cable splice box's entry place, but it is unable to simultaneously allow two uncut main cables to penetrate and waterproof with elastic rubber shrinkable pipe. However to use the cable splice box whose main cable is waterproofed by elastic rubber shrinkable pipe to carry out straight splicing and branch splicing, in addition to using heat shrink cable splice box to carry out mid-span connecting branch splicing, compared to using just one type of splice box, will naturally incur production costs to telecommunication enterprises. However in consideration of costs and to choose heat shrink cable splice box to carry out straight splicing, branch splicing and mid-span connecting branch splicing, there will be a significant forfeit in safety since straight splicing and branch splicing do not require fire. In order to solve the problem above mentioned, the present invention utilizes a different approach to waterproofing the main cable of the cable splice box, the cable splice box includes a protective cover and at least a cable penetrating the entry space, the cable penetrating the entry space has at least 3 hollow cylindrical columns, at least one hollow cylindrical column provides entry for two main cables that are preparing for heat shrink waterproofing into the cable splice box, the two remaining hollow cylindrical columns each provides entry for one main cable that is preparing for elastic rubber shrinkable pipe waterproofing into the cable splice box. Since there is limited space in man holes and hand holes, it is best to minimize the sizes of boxes mounted overhead, thus it is best to develop cable splice boxes that are thin and minute. However other than the main cable, the cable entry place of the cable splice box usually has around 4 branch splicing entry openings installed, while the cost is low and the construction is easy for the heat shrink cable splice box, during the torching of the heat shrink tube of the first cable entry opening to waterproof the opening in a heat shrink cable splice box, and when torching heat shrink tubes of other cable entry openings on the cable entry place, neighboring heat shrink pipes that are already torched are subjected to further heating, therefore they soften, loosen and causes water leakage in cable splice box. In order to lower the impact of this problem, the main cable and branch cable entry openings situated on the cable entry place, which has a limited surface area, are placed as far apart from one another, thus it is difficult to adjust in order supply enough space for the installation of two other main cable entry openings whose main cables are waterproofed by elastic rubber shrinkable pipes. Since the present invention can utilize different ways of carrying out the waterproofing of the main cable of the cable splice box, only the main cable entry opening needs the heat shrink tube for waterproofing, other branch cable entry openings can use elastic rubber shrinkable pipes for waterproofing. Because there is no need for fire after torching the heat shrink tube to waterproof the main cable, there can be a more concentrated design with a closer proximity between main cable and branch cable entry openings, which are situated on a cable entry place with limited surface area. Furthermore there can be extra space on the cable entry space, allowing additional installation of 2 main fiber-optic cable openings waterproofed by elastic rubber shrinkable pipes, while most diameters of main cable entry openings are larger than the diameters of branch cable entry openings. Therefore, the current invention's utilization of different ways of carrying out waterproofing of the main cable of the cable splice box, not only satisfy the operational needs of straight splicing, branch splicing and mid-span connecting splicing, requires torching only for heat shrink waterproofing of the main fiber-optic cable during mid-span connecting splicing, whereas in most operations belonging to straight splicing and branch splicing, there is no need for fire at all. Therefore the present invention not only significant reduces costs for the field of telecommunication enterprises, more importantly it prevents the dangers associated with using fire during construction, satisfying the safety goal of telecommunication enterprises to minimize and decrease the frequency of fire usage during construction.

Through research, it is found that when cable splice box is used for telecommunication fiber-optic cable splicing, the position of the support of the fiber-optic collection plate in the cable splice box and the relative position of main optical fiber cable opening is closely related to the splice and intake quality of the fiber-optic in the cable splice box. The main fiber-optic cable after penetrating the cable entry place's cable entry opening enters into the cable splice box, the fiber-optic cable requiring splicing after being spliced, is connected and placed in the fiber-optic collection plate, which is on the right side of the fiber-optic collection plate support. While most of the fiber-optic cables using mid-span connecting splicing do not need to be cut to be connected into the fiber-optic collection plate, most preferably kept in the back side of the fiber-optic collection plate, in order to prevent interference with other fiber-optic cable configurations that need to be connected to and situated in the fiber-optic collection plate on the right side of the fiber-optic collection plate support, and to prevent interference with other fiber-optic cables that need to be connected to and situated in the fiber-optic collection plate on the right side of the fiber-optic collection plate support. This avoids problems caused by the mixing of fiber-optic cable collection configurations and enables easier maintenance. Thus, the position of the main fiber-optic cable opening is most preferably situated in the back side of the fiber-optic collection plate supporting fixture, providing enough space to carry out the compilation and splice of fiber-optic cables after the main cable enters the cable splice box; especially as most of the cables from mid-span connecting splicing do not need to be cut and connected for storage in the fiber-optic collection plate, and it is preferably without any interference, smoothly stored in the back side of the fiber-optic collection plate. Whereas the present invention's main cable entry opening of the cable entry place has two types; one is the cable entry opening preparing for heat shrink tube waterproofing of the main cable, the other is the cable entry opening preparing for elastic rubber shrinkable tube waterproofing of the main cable. While the two different main cable openings are situated in different places on the cable entry place, providing enough space to carry out the compilation and splice of cables after the main cable enters the cable splice box; especially as most of the cables from mid-span connecting splicing do not need to be cut and connected for storage in the fiber-optic collection plate, and it is preferably without any interference, smoothly stored in the back side of the fiber-optic collection plate. Therefore, the present invention utilizes different ways to carry out waterproofing of the main cable of the cable splice box, and further includes at least one fiber-optic collection plate support that can be disposed on the cable entry place, the cable entry place has at least one fixed installation, used to fix the fiber-optic collection plate support, and the fixed installation can accommodate the different entry positions of the main cable and fix the fiber-optic collection plate support onto the different positions of the cable entry place, the fiber-optic collection plate support fixed on the position of the cable entry place, can adjust and accommodate according to differences in positioning of the cable entry place where the main cable penetrates, all these solve the shortcomings of the current technology.

Through research, it is discovered that when cable splice boxes are used for telecommunication fiber-optic cable splicing, the storing and configuration of optical fiber cable in cable splice box often results in errors in communication due to the small curvature of the radius when the cable is bent, and when the cable fastening tube is over bent; the over bent cable fastening tube after awhile results in the fixed-shaped plastic of the cable fastening tube, often causing communication errors and even broken lines while unfolding during checkups and maintenance. This happens especially frequently when the cables penetrating the cable entry opening of the cable entry place into cable splice box, when forced to bend due to resistance and interference by the fiber-optic collection plate on the cable collection support. Thus the cable penetrating the cable entry opening of the cable entry place into the cable splice box, the situations whereby cables need to be bent due to tension from distribution and storage should be as low as possible, and when there must be bending, the curvature of radius must not be too small. The fiber-optic collection plate on the fiber-optic collection plate support in the cable splice box, is the largest obstacle that blocks and interferes with cable distribution; when optic fibers enter the cable splice box, they must bend when the path of cable distribution encounters the blocking and interference of fiber-optic collection plate. Therefore regardless of whether main cable or branch cable, the paths of cable distribution after entering the splice box should strive to avoid the interference of the distribution board; when there are more cables in main cable, especially most of the cables from mid-span connecting splicing do not need to be cut and connected into the cable collection board. Thus, the present invention can utilize different ways of waterproofing the main cable of the cable splice box. It further includes the position of hollow cylindrical column which the main cable penetrates provided by the cable entry place, after it is installed in main cable, which penetrates the hollow cylindrical column into the cable splice box, whose straight path of the fiber-optic collection plate support's side is installed with multiple fiber-optic collection plates, a position that will not be blocked or interfered by the fiber-optic collection plate, solving the shortcomings of the current technology.

The present invention utilizes different ways to waterproof the main cable of the cable splice box, when used for cable's mid-span connecting splicing, it uses heat shrink tube to waterproof the main cable in the cable entry place. After researching on the usage of leaky heat shrink type cable splice box, two reasons became apparent for the water leakage in heat shrink type cable splice box. One reason is because of the poor waterproofing structure of the splice between the protective cover and the cable entry place, another reason is due to enveloping the exterior of hollow cylindrical columns and cable's heat shrink tube loosening at the splice between the heat shrink tube and the attached cable. Although through improving on the waterproofing structure of the splice between the protective cover and the cable entry place will prevent water-leakage, there are still many occurrences of water-leakage in the heat shrink cable splice box.

After thorough research, it is discovered that in the heat shrink cable splice box, the heat shrink tube, used for waterproofing, enveloping the exterior of the hollow cylindrical column in the cable entry place is loosening at its splice with the attached cable, being the cause of water-leakage in the cable splice box. After the cable splice box is heat shrink waterproofed, no matter if it is fastening the cable splice box into man holes or hand holes, or extracting the cable splice box from man holes or hand holes for rerouting, extracting branches, maintenance and associated operations, because the cable splice box needs to be moved, it causes bending of the cable, which is connected to the exterior of the cable splice box and already heat shrink tube wrapped and waterproofed, causing the loosening of the splice between the enveloping heat shrink tube and the cable, leading to water-leakage in the cable splice box. Especially, the coating layers of cables outdoors are mostly made of PE; in general about the waterproof heat shrink tube of heat shrink type cable splice box, the adhesive strength is weak between the cable's thermal sol coatings and the PE coatings, easily loosened due to the pressure from twisting the cable.

In order to overcome the present lack of technology, after careful and thorough research, the present invention's telecommunication cable splice box, with an elastic rubber shrinkable pipe waterproofing device, can allow at least one cable securing device attached on the exterior of the cable splice box, the device includes a first securing portion that can be secured on the heat shrink type cable splice box, and a second securing portion connected to the first securing portion that can secure incoming cables of the cable splice box; in addition it can use a supporting portion to connect the first securing portion and second securing portion, the device is made of sturdy metal or plastic material that is resistant to twisting or manipulation. When the cable securing device of cable splice box secures incoming cables to the device, while moving the cable splice box, although the cable, that is connected to the exterior of the cable splice box and has been waterproofed by enveloping heat shrink tube, becomes twisted, the fulcrum of exerted pressure and twisting is at the second securing portion of the cable's securing device; while the waterproof portion of the cable that is enveloped by the heat shrink tube, is positioned between the first securing portion and second securing portion, it will not be affected and loosen due to the cable twisting and exerting pressure. Naturally, the cable securing device on the exterior of the cable splice box can be utilized for securing conventional cables that are waterproofed by the heat shrink tube, and it can also be utilized to secure cables that are waterproofed by elastic rubber shrinkable pipe. The cable securing device on the exterior of the cable splice box: the first securing portion can in one piece with or planted on the cable splice box's cable entry place, and can be secured on the cable splice box using a screw splice, a mortise joint, a clamp joint, a ring fastener, a band fastener etc., and other ways of securing; the second securing portion can be in one piece with the first securing portion or connected to first securing portion by mechanical means, and the incoming cables can be fastened with a clamp joint, a ring fastener, a band fastener etc., and other ways of fastening onto the second securing portion; the supporting portion is in one piece or mechanically connected with the first securing and second securing portions, the supporting portion can use one of the first end to securely connect to the first supporting portion and use one of the second end to secure the incoming cables, while the incoming cables can be secured to supporting portion's second end using a clamp joint, a ring fastener, a band fastener etc., and other ways of fastening. The incoming cables can be secured to the second securing portion or the supporting portion's second end through the following places: where the cable has not been enveloped by heat shrink tube and elastic rubber shrinkable pipe, where the cable has been enveloped by heat shrink tube and elastic rubber shrinkable pipe, the place of convergence between where the cable has been enveloped by heat shrink tube and elastic rubber shrinkable pipe and where the cable has not been enveloped. While the interior of the cable entry place in the cable splice box's interior also secured with present invention's cable securing device, is used to secure cables that already entered the cable splice box.

METHOD OF EMBODIMENT

The present invention "CABLE SPLICE BOX THAT UTILIZES DIFFERENT WAYS TO CARRY OUT WATERPROOFING OF THE MAIN CABLE" can be thoroughly understood with the following explanations of embodiments, allowing those skilled in the present art to carry out. However, the present invention's ways of implementation are not restricted by the following embodiments, those skilled in the present art can accordingly propose other types of embodiments, the embodiments are included in the scope of the present invention.

Embodiment 1

Figure 1:
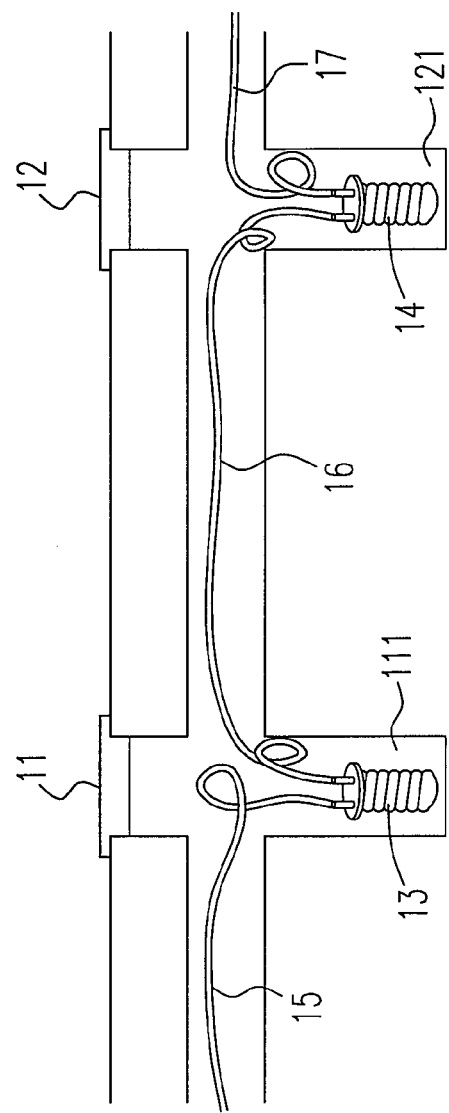
FIG. 1 is a cross-section schematic diagram illustrating the underground layout of cable splice boxes.
Figure 2A:
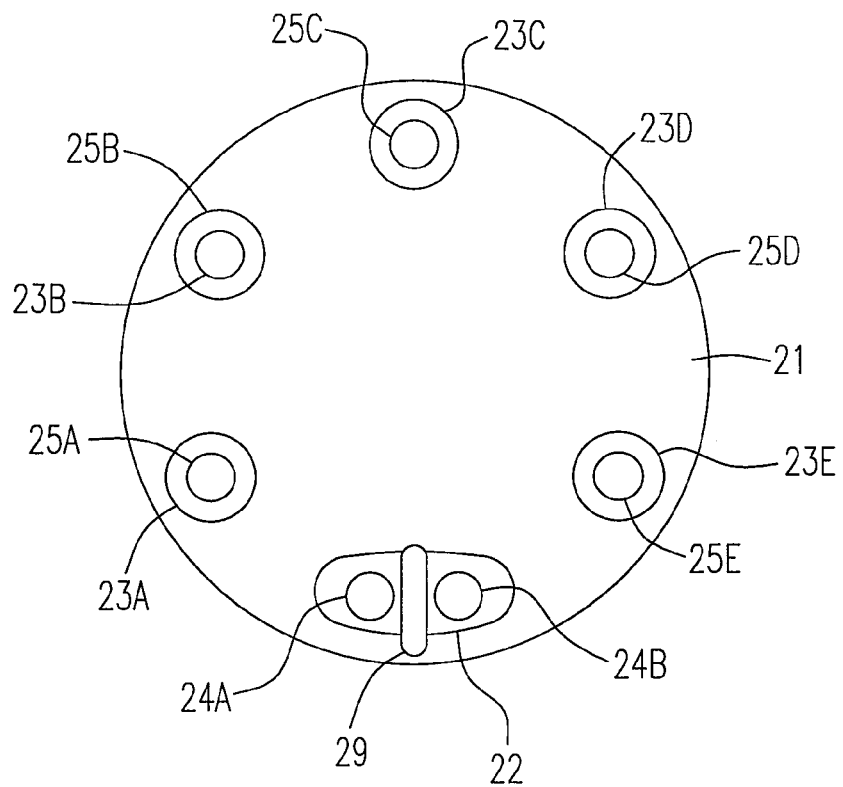
FIG. 2(A) is vertical view of heat shrink tube cable splice box.
Figure 2B:
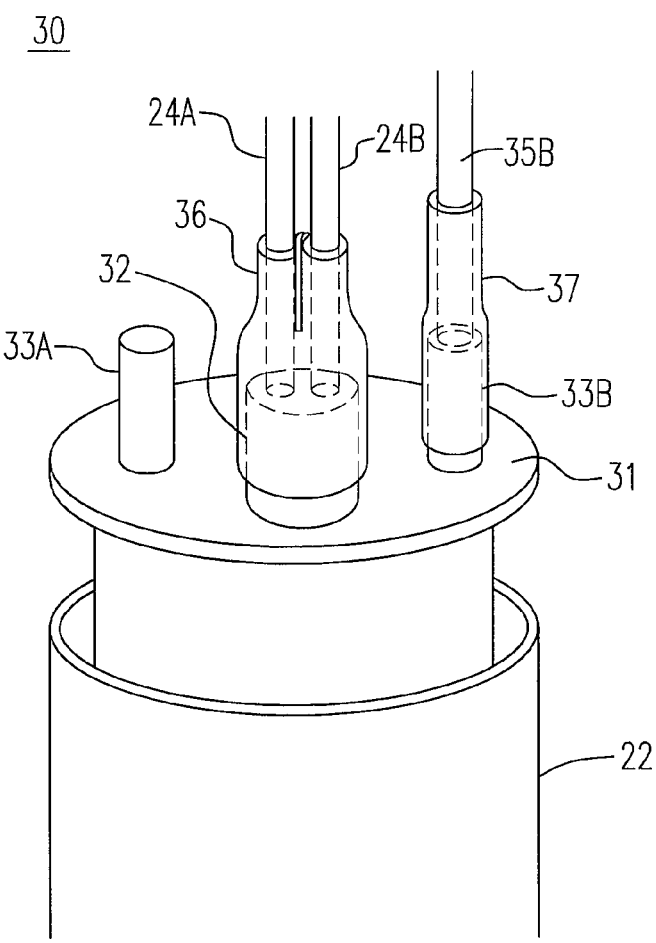
FIG. 2(B) is a schematic figure of the heat shrink type cable splice box carrying out waterproofing treatment.
Figure 2C:
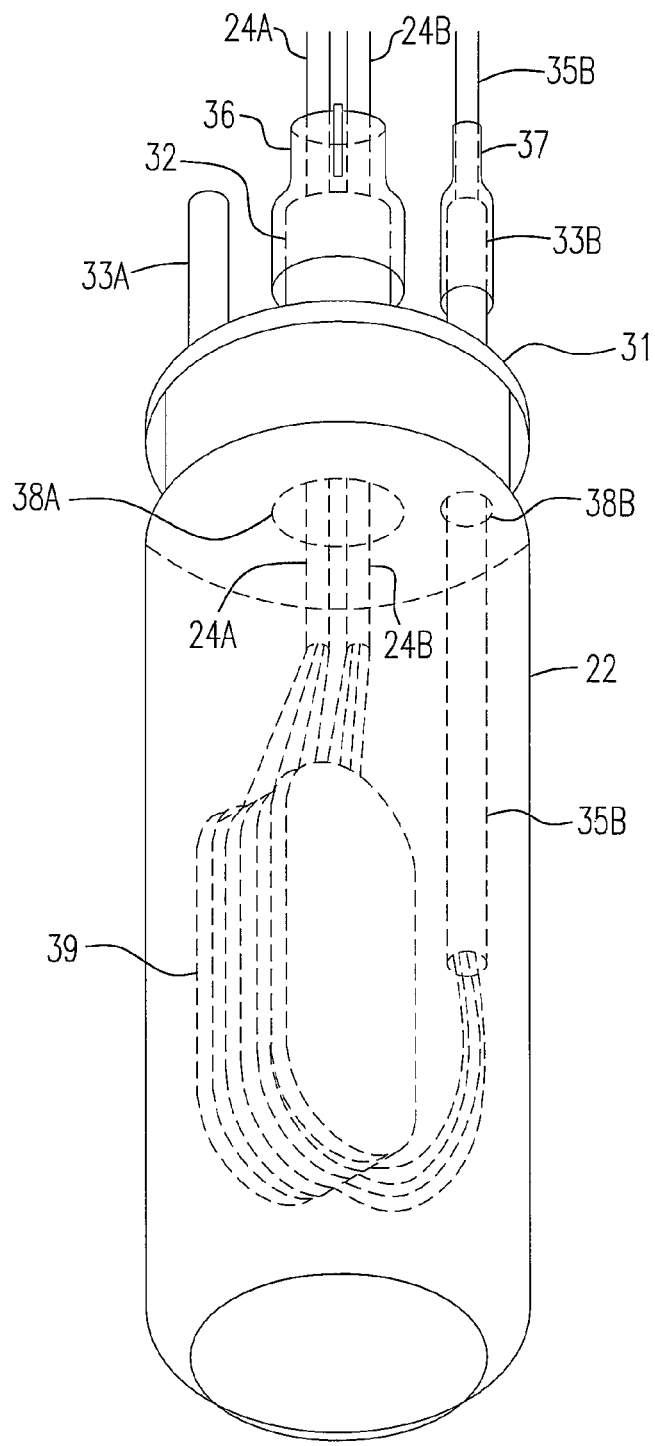
FIG. 2(C) is a schematic figure of cables entering heat shrink type cable splice box to carry out waterproofing treatment.
Figure 3A:
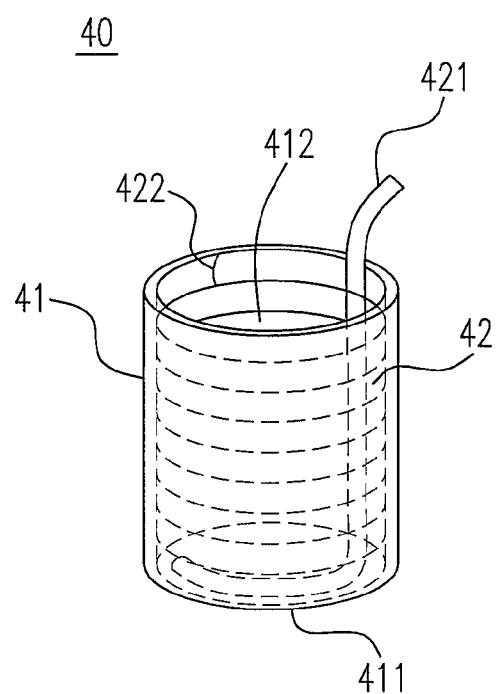
FIG. 3(A) is a schematic figure of elastic rubber shrinkable pipe.
Figure 3B:
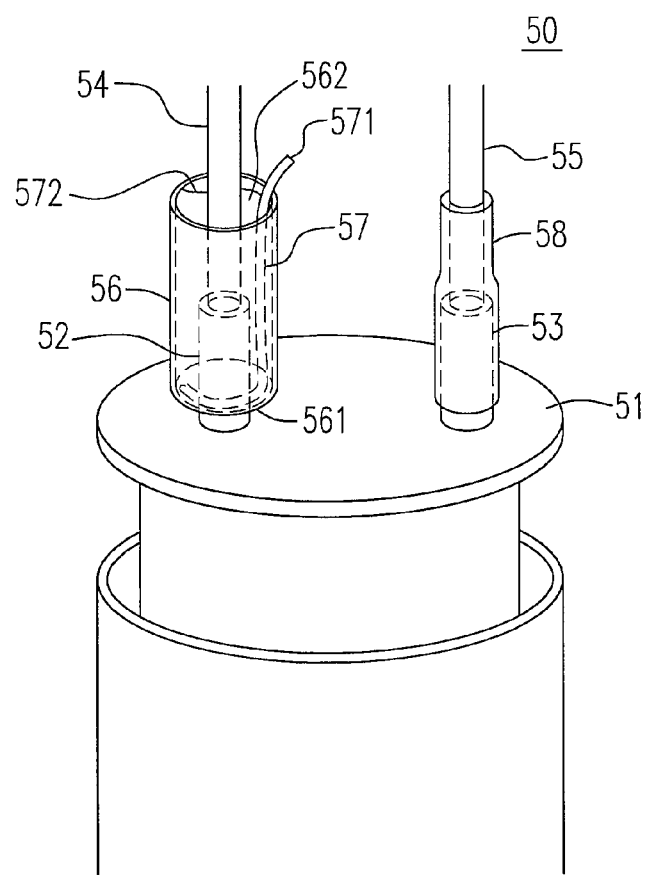
FIG. 3(B) is a schematic figure of a telecommunication cable splice box with an elastic rubber shrinkable pipe waterproofing installation.
Figure 4A:
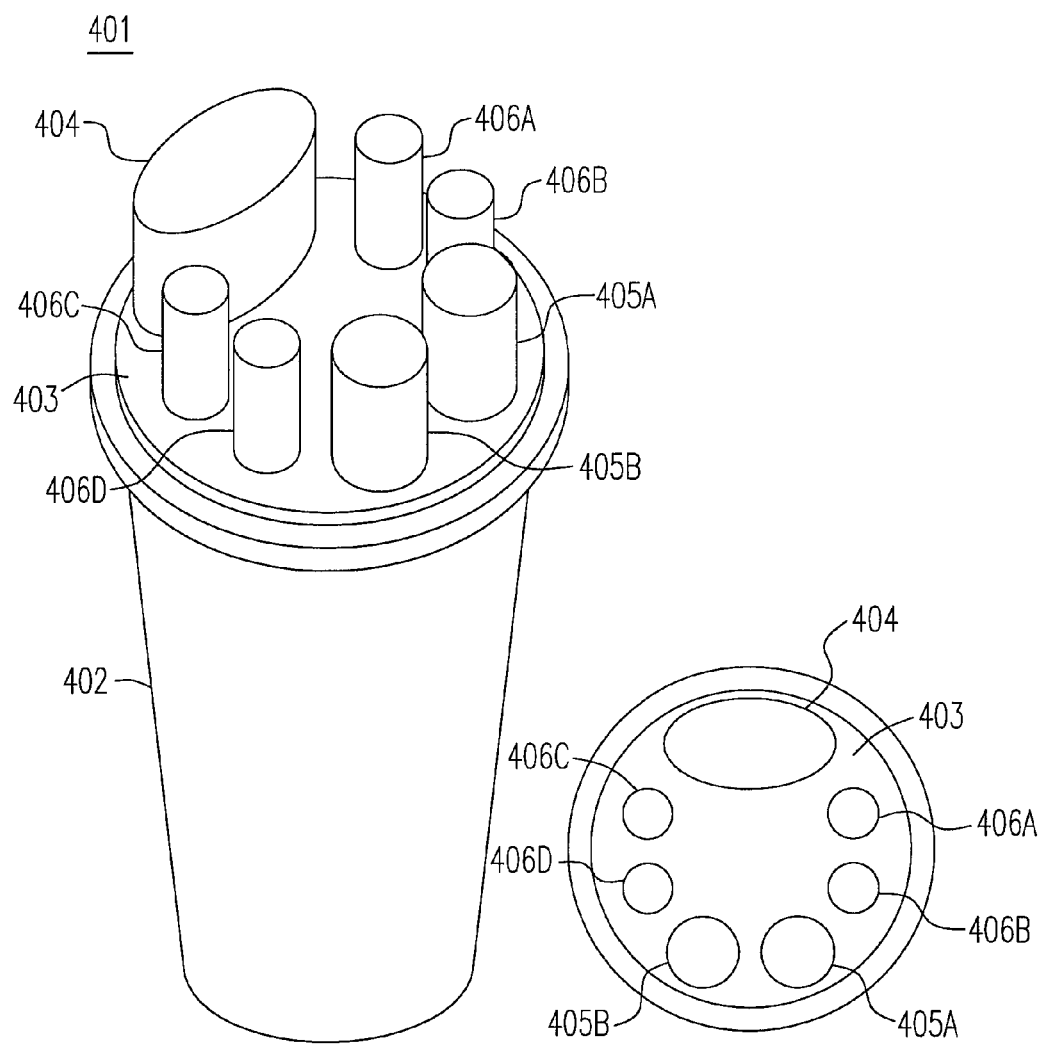
FIG. 4(A) is a schematic figure of the different ways of carrying out waterproofing of the main cable of the cable splice box according to embodiment 1.
Figure 4B:
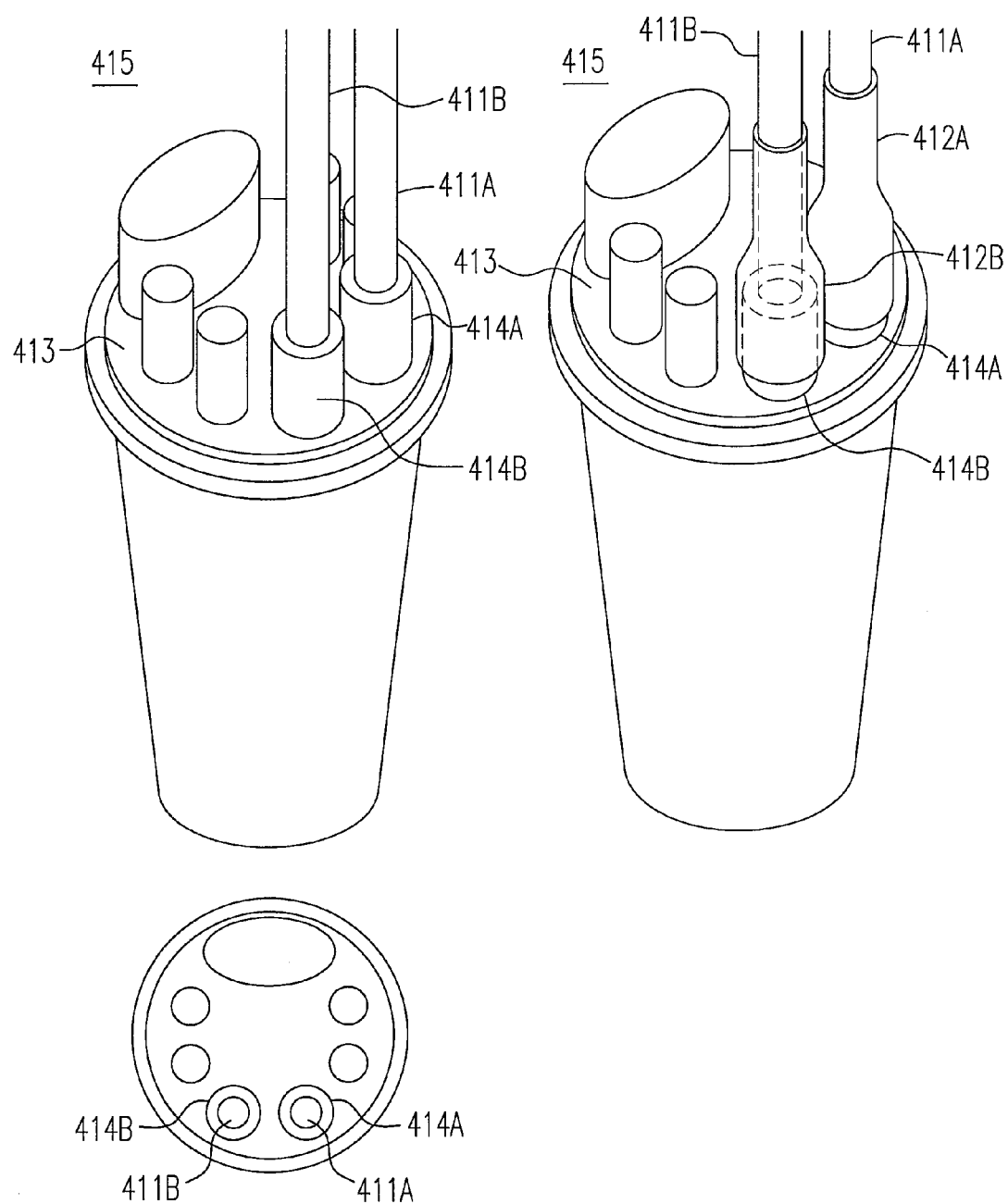
FIG. 4(B) is a schematic figure of the different ways of carrying out waterproofing of the main cable of the cable splice box during straight splicing and branch splicing, when the main cable is waterproofed with elastic rubber shrinkable pipe, according to embodiment 1.
Figure 4C:
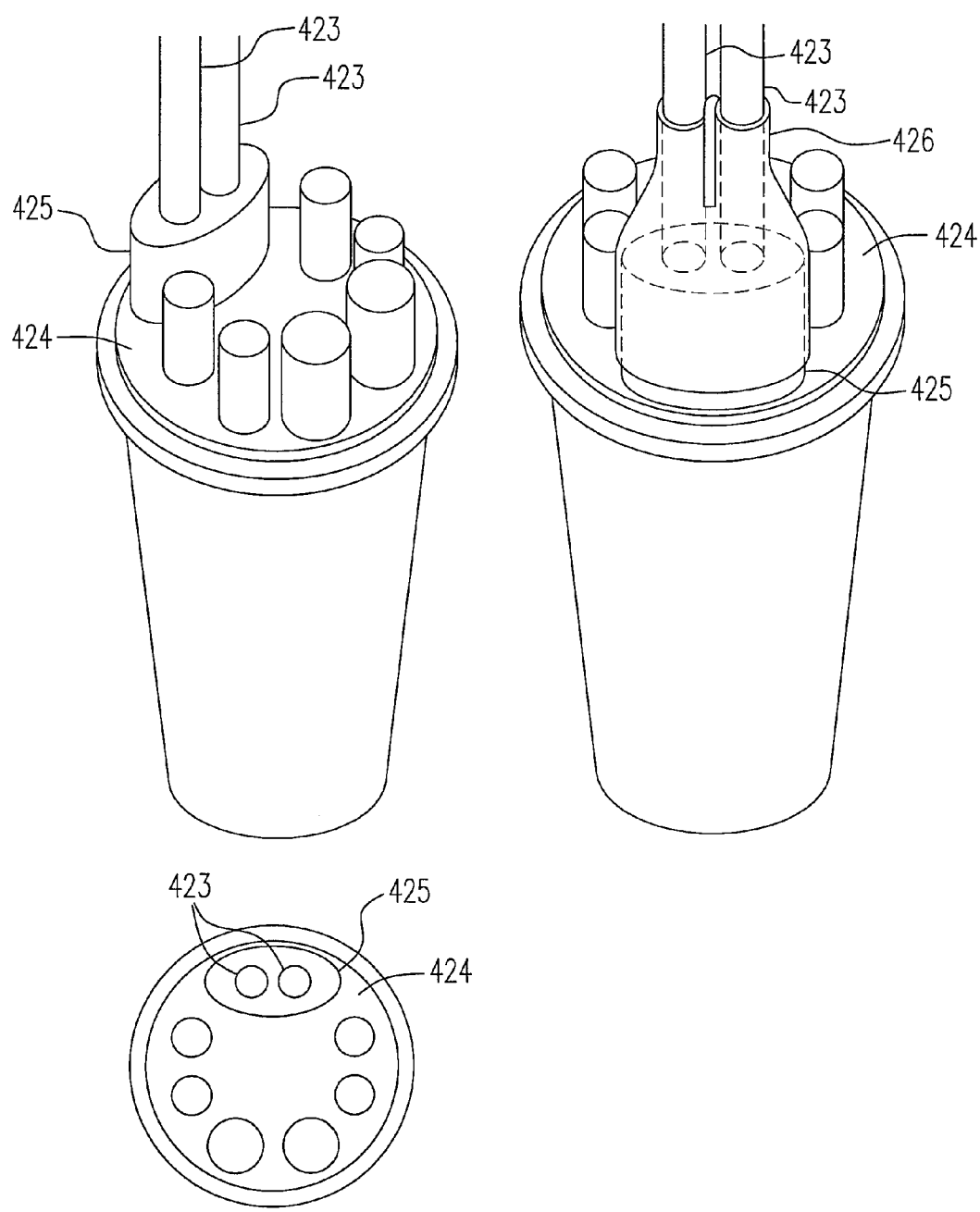
FIG. 4(C) is a schematic figure of the different ways of carrying out waterproofing of the main cable of the cable splice box during mid-span connecting branch splicing, when the main cable is waterproofed with heat shrink tube, according to embodiment 1.

Please refer to FIG. 4(A), which is the schematic figure for which the present embodiment 1 utilizes different ways of waterproofing the main cable. In FIG. 4(A), the cable splice box 401 includes a protective cover 402 and including at least one cable entry place 403; the cable entry place has multiple hollow cylindrical columns, at least one of which is a hollow cylindrical column 404 which provides access for 2 main cables preparing for heat shrink tube waterproofing to penetrate the cable splice box, and at least 2 hollow cylindrical columns 405A, 405B and each hollow cylindrical column can provide access for a piece of main cable preparing for elastic rubber shrinkable pipe waterproofing to penetrate the cable splice box. In addition, the cable entry place has 4 hollow cylindrical columns 406A, 406B, 406C, 406D that allows access for a piece of branch cable preparing for elastic rubber shrinkable pipe waterproofing to penetrate the cable splice box; the cable splice box 401 allows for 3 different types of cable splicing: telecommunication cable's straight splicing, branch splicing and mid-span connecting branch splicing, etc. Please refer to FIG. 4(B) for straight splicing and branch splicing, the two main cables 411A, 411B that are cut individually penetrate 2 hollow cylindrical columns 414A, 414B installed on the cable entry place 413, which are preparing for elastic rubber shrinkable pipe waterproofing, to enter into the cable splice box 415, and utilize elastic rubber shrinkable pipes 412A, 412B for waterproofing. Please refer to FIG. 4(C) for mid-span connecting branch splicing, main cable 423 that is uncut in a folding manner renders 2 main cables 423 to simultaneously penetrate cable entry place 424's attached hollow cylindrical column 425, which is preparing for heat shrink tube waterproofing, to enter into the cable splice box 426, and use heat shrink tube 427 to carry out waterproofing.

The cable splice box of the present invention's embodiment 1, when the main cable is carrying out straight splicing and branch splicing operations, can utilize elastic rubber shrinkable pipe for waterproofing; when the main cable encounters the need for mid-span connecting splicing operation, under the condition that does not require changing cable splice boxes, it can utilize heat shrink tube to carry out main cable waterproofing. Thus, it solves the problem currently encountered in cable splice box technology, whereby the installation of main cable entry opening only allows one of either heat shrink tube or elastic rubber shrinkable tube to carry out waterproofing, leading to rising costs for telecommunication enterprises and affect the safety of construction.

Embodiment 2

Figure 4D:
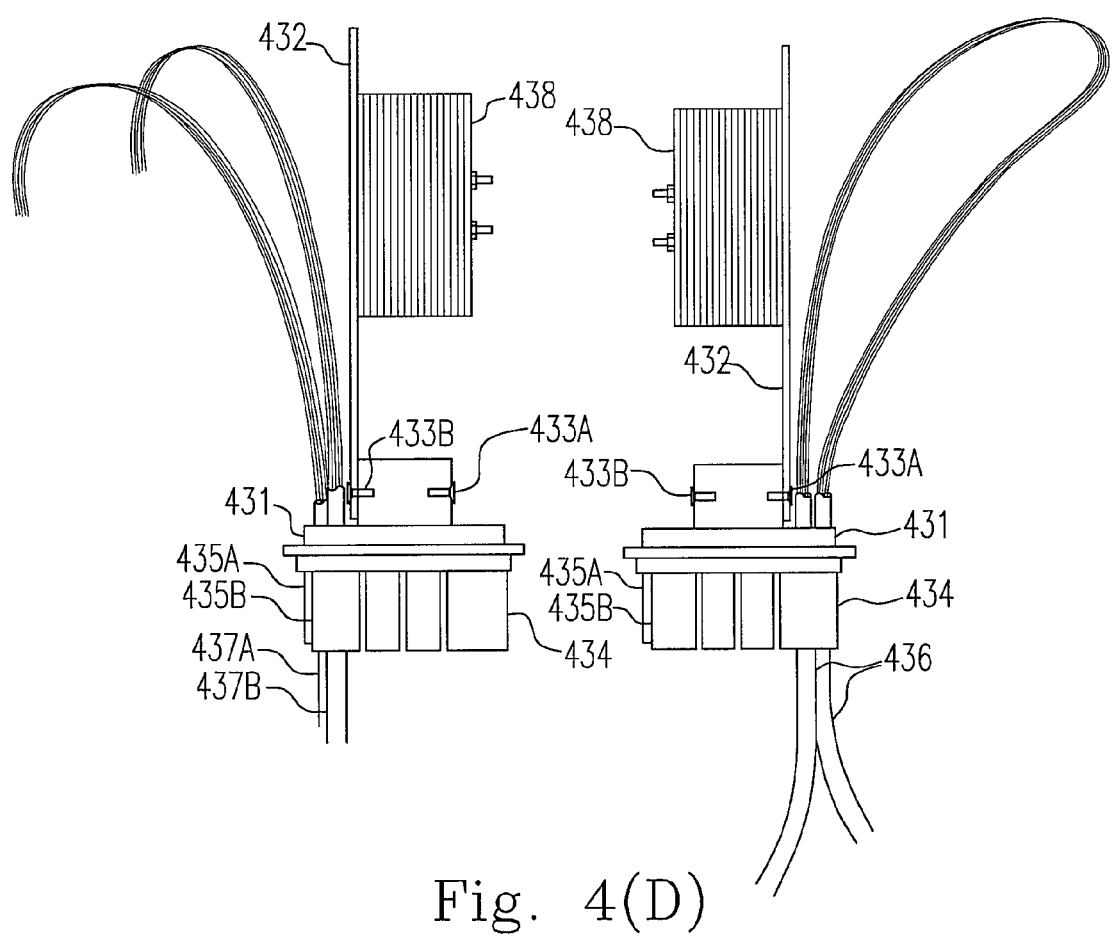
FIG. 4(D) is a schematic figure of the manner of securing optical fiber cable collection plate support and the position of the main cable entry opening, of the different ways of carrying out waterproofing of the main cable of the cable splice box, according to embodiment 2.

Please refer to FIG. 4(A), which is the schematic Figure for which the present embodiment 1 utilizes different ways of waterproofing the main cable. In FIG. 4(A), the cable splice box includes a protective cover and at least a cable entry place, the cable entry place has multiple hollow cylindrical columns, at least one of the hollow cylindrical column allows access for 2 main cables preparing for heat shrink tube waterproofing to penetrate the cable splice box, and at least 2 hollow cylindrical columns and every hollow cylindrical allows access for a main cable preparing for elastic rubber shrinkable pipe waterproofing to penetrate into the cable splice box, the cable entry place also has 4 hollow cylindrical columns that can allow access for a branch cable preparing for elastic rubber shrinkable pipe waterproofing to penetrate into the cable splice box. Please refer to FIG. 4(D) for the cable splice box, it furthermore includes at least a fiber-optic cable collection plate support 432, which can be secured to the cable entry place 431. The cable entry place has at least a securing device 433A, 433B, used to secure the fiber-optic collection plate support 432; furthermore the securing devices 433A, 433B can coordinate with the different entry positions 434, 435A, 435B of main optical fiber cables 436, 437A, 437B, secure the optical fiber cable collection plate support 432 to the different positions on the cable entry place 431. Moreover, the cable splice box further includes the positions where main cables 436, 437A, 437B penetrate hollow cylindrical columns 434, 435A, 435B provided by the cable entry place 431; the main cables 436, 437A, 437B that penetrates through the hollow cylindrical columns 434, 435A, 435B into the cable splice box travels in a direct path into a optical fiber cable collection plate 438, which stores the most amount and is on the side of the optical fiber collection plate support 432, will be in a position unblocked and not interfered by the optical fiber cable collection plate 438.

Therefore, in the present invention's embodiment 2, since the securing device of the cable entry place can accommodate and coordinate with the different entry positions of the main optic fiber cable, and secure the optical fiber cable collection plate support on different positions of the cable entry place. Furthermore, the position of the cable entry surface installed to facilitate the main cable to penetrate the cable entry opening, is in a position where the straight path of the optical fiber distribution, from the main cable entering the cable splice box, will not be blocked or interfered by the optical fiber cable collection plate. Thus, the present invention further solves the problem whereby when the main cable enters into the cable splice box from different positions, causing inability of the optical fiber distribution to be stored smoothly, and causing interference and blockage from the optical fiber cable collection plate, leading to errors in optical fiber cable communication and other problems.

Embodiment 3

Figure 5:
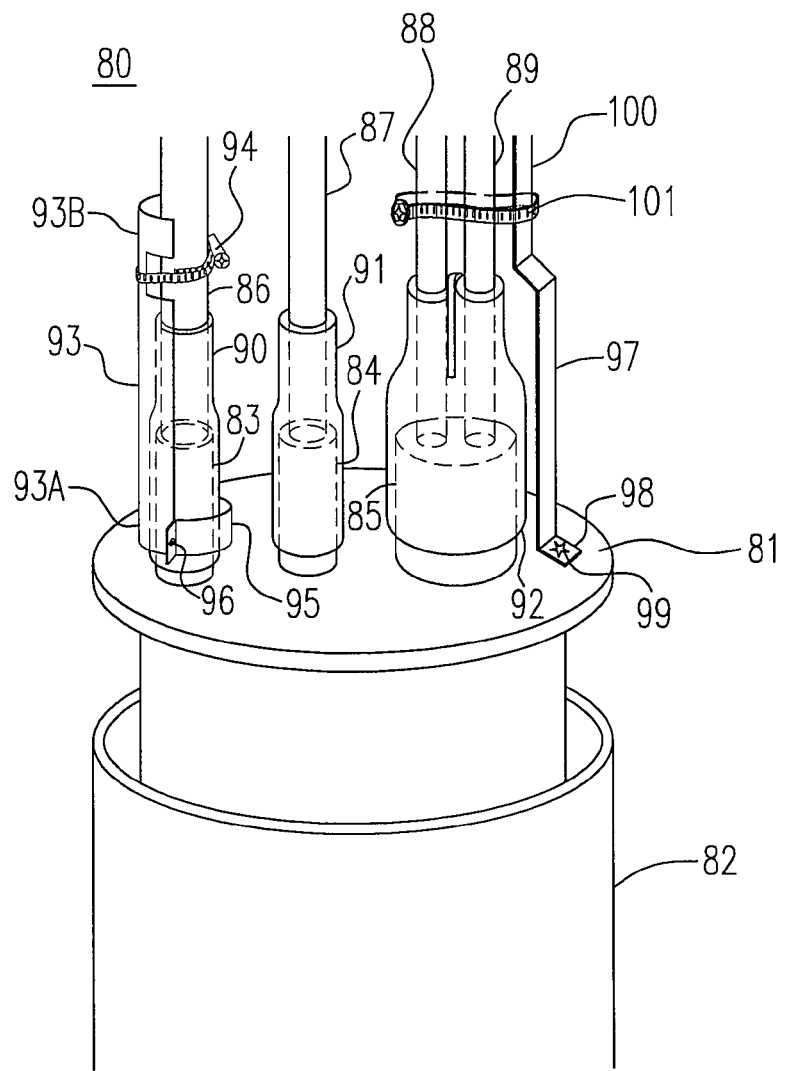
FIG. 5 is a schematic figure of the different ways of carrying out waterproofing of the main cable of the cable splice box, according to embodiment 3.

Please refer to FIG. 5, which is the schematic figure for which the present embodiment 3 utilizes different ways of waterproofing the main cable. In FIG. 5, the cable splice box 80 provides for 3 different types of cable splicing: telecommunication cable's straight splicing, branch splicing and mid-span connecting branch splicing, etc. The current invention's cable splice box 80 includes at least cable entry place 81, multiple hollow cylindrical columns 83, 84, 85 on cable entry place 81, protective cover, multiple elastic rubber shrinkable pipe, a heat shrink type cable splice box intending on mid-span connecting branch splicing of main cable that uses heat shrink tube and multiple cable securing devices on the exterior of cable splice box 80 and a optic fiber cable collection plate support that can be installed on the cable entry place, of which the waterproofing of branch cables and main cables are the same as embodiment 1. The difference being, the cable securing device on the exterior of the cable box 80 secures and attaches branch cables and main cables to the device, the cable securing device on the exterior of the cable box 80 includes: a first securing portion 98 and a clip 95 assembled with screw 96 (and another screw, not shown in FIG. 5), securing and fastening the first securing portion 98 to hollow cylindrical column 85. The second securing portion 100, through a screw tightly locked to clamp joint 94, secures and fastens cable 88, 89 entering the cable splice box 80. Through the set up of the second securing portion 100 connected to the first securing portion 98 described above, cable 88, 89 that is enveloped by heat shrink tube 92 and the elastic rubber shrinkable pipe is additionally secured to cable splice box 80; when moving the cable splice box 80 and the cable 88, 89 bends, the fulcrum under pressure is at the second securing portion 100, thus the waterproof portion of the cable 88, 89 enveloped by the heat shrink tube 92 and the elastic rubber shrinkable pipe, will not loosen due to the effects of cable 88, 89 bending, resulting in water leaking into cable splice box 80. The cable securing device further includes supporting portion 97, used to attach the first securing portion 98 and second securing portion 100. The second securing portion 100 can be in one piece with supporting portion 97; the first securing portion 98 can be in one piece with the supporting portion 97; or, the first securing portion 98, the second securing portion 100 and supporting portion 97 can all be in one piece. Furthermore, supporting portion 97 can connect with first securing portion 98, and the supporting portion 97 is secured on cable splice box 80. Similarly, the cable 90, 91 entering hollow cylindrical column 83, 84, 85 and is enveloped by heat shrink tube 92 and the elastic rubber shrinkable pipe can be likewise additionally secured.

Through the explanations of above embodiments 1, 2 and 3, the present invention's cable splice box can utilize different ways to waterproof the main cable, and can effectively solve the problems present in current cable splice box technology, whereby the set of the main cable entry opening can only provide one way of waterproofing the main cable, that is either the heat shrink tube or the elastic rubber shrinkable pipe, resulting in rising costs for telecommunication enterprises and the problem of safety in construction.

There are more embodiments provided as follows.

Embodiment 1

A cable splice box utilizing various ways to waterproof two main cables, comprising a protective cover; and at least one cable entry end having plural hollow cylindrical columns, wherein at least one of the plural hollow cylindrical columns allows passage of the two main cables, to be waterproofed by a heat shrink tube, into the cable splice box, and there are at least additional two of the plural hollow cylindrical columns, each of which allows a passage of another main cable, to be waterproofed by an elastic rubber shrinkable pipe, into the cable splice box.

Embodiment 2

The cable splice box in Embodiment 1 further comprising at least one optical fiber cable collection plate support capable of being secured to the cable entry end, wherein each of the at least one cable entry end has at least one securing device for securing the optical fiber cable collection plate support and, in response to a specific entry position of the respective main cable, securing the optical fiber cable collection plate support to a specific position on the cable entry end.

Embodiment 3

The cable splice box in Embodiment 2, wherein a specific one of the plural hollow cylindrical columns for passing therethrough a specific one of main cables is located at a position on the at least one cable entry end without the possibility of interfering a passage of the specific main cable into the cable splice box after the optical fiber collection plate support has mounted thereon a maximum number of optical fiber collection plates.

Embodiment 4

The cable splice box in Embodiment 3, wherein a specific one of the plural hollow cylindrical columns for passing therethrough a branched cable is located at a position on the at least one cable entry end without the possibility of interfering a passage of the specific branched cable into the cable splice box after the optical fiber collection plate support has mounted thereon a maximum number of optical fiber collection plates.

Embodiment 5

The cable splice box in Embodiment 3 further comprising at least two elastic rubber shrinkable tubes for waterproofing the cables passing the cable splice box via the at least one cable entry end.

Embodiment 6

The cable splice box in Embodiment 3, further comprising at least one of the heat shrink tube for waterproofing the cables passing the cable splice box via the at least one cable entry end.

Embodiment 7

The cable splice box in Embodiment 4 further comprising at least one cable securing device configured on an exterior of the cable splice box, and having a first securing portion secured to the cable splice box; and a second securing portion connected to the first securing portion for securing a cable introduced into the cable splice box to be waterproofed by one of the heat shrink tube and the elastic rubber shrinkable pipe.

Embodiment 8

The cable splice box in Embodiment 7, wherein the first securing portion is embedded in the at least one cable entry end of the cable splice box.

Embodiment 9

The cable splice box in Embodiment 7, wherein the first securing portion is one-piece formed on the at least one cable entry end of the cable splice box.

Embodiment 10

The cable splice box in Embodiment 7, wherein the first securing portion and the at least one cable entry end of the cable splice box are secured together through one selected from a group consisting of a screw splice, a mortise joint, a clamp joint, a ring fastener, a band fastener and a combination thereof.

Embodiment 11

The cable splice box in Embodiment 7, wherein the second securing portion and the cable are secured together through one selected from a group consisting of a clamp joint, a ring fastener, a band fastener and a combination thereof.

Embodiment 12

The cable splice box in Embodiment 7 further comprising a supporting portion for connecting the first securing portion and the second securing portion.

Embodiment 13

The cable splice box in Embodiment 12, wherein the second securing portion is one-piece formed with the supporting portion.

Embodiment 14

The cable splice box in Embodiment 12, wherein the second securing portion is mechanically connected to and secured to the supporting portion.

Embodiment 15

The cable splice box in Embodiment 12, wherein the first securing portion is one-piece formed with the supporting portion.

Embodiment 16

The cable splice box in Embodiment 12, wherein the first securing portion is mechanically connected to and secured to the supporting portion.

Embodiment 17

The cable splice box in Embodiment 12, wherein the supporting portion is connected to and secured to the first securing portion.

Embodiment 18

The cable splice box in Embodiment 12, wherein the material of the supporting portion is one selected from a group consisting of a metal, a plastic, and a combination thereof.

Embodiment 19

A cable splice box, comprising at least one cable entry end, each of which has: a first hollow cylindrical column allowing passage of a U-turned main cable to be waterproofed in a first type of treatment; and a second hollow cylindrical column only allowing passage of a main cable end to be waterproofed in a second type of treatment.

Embodiment 20

A method for waterproofing a cable splice box having a cable entry end, comprising steps of providing the cable entry end with a first hollow cylindrical column allowing passage of a U-turned main cable and a second hollow cylindrical column only allowing passage of a main cable end; and performing at least one of the following two steps causing the U-turned main cable to pass through the first hollow cylindrical column and waterproofing the U-turned main cable in a first type of treatment; and causing the main cable end to pass through the second hollow cylindrical column and waterproofing the main cable end in a second type of treatment.

Embodiment 21

The method in Embodiment 20, wherein the crosssection of the first hollow cylindrical column is elliptical and the crosssection of the second hollow cylindrical column is circular.

Embodiment 22

The method in Embodiment 20, wherein the first type and the second type of treatments are the same.

Embodiment 23

A cable splice box, comprising a first hollow cylindrical column of an elliptical crosssection; and a second hollow cylindrical column of a circular crosssection.

While the invention has been described in terms of what is presently considered to be the most practical and preferred Embodiments, it is to be understood that the invention needs not be limited to the disclosed Embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A cable splice box utilizing various ways to waterproof two main cables, comprising:
   a protective cover; and
   at least one cable entry end having plural hollow cylindrical columns, wherein at least one of the plural hollow cylindrical columns allows passage of the two main cables, to be waterproofed by a heat shrink tube, into the cable splice box, and there are at least additional two of the plural hollow cylindrical columns, each of which allows a passage of another main cable, to be waterproofed by an elastic rubber shrinkable pipe, into the cable splice box.

2. The cable splice box as claimed in claim 1 further comprising at least one optical fiber cable collection plate support capable of being secured to the cable entry end, wherein each of the at least one cable entry end has at least one securing device for securing the optical fiber cable collection plate support and, in response to a specific entry position of the respective main cable, securing the optical fiber cable collection plate support to a specific position on the cable entry end.

3. The cable splice box as claimed in claim 2, wherein a specific one of the plural hollow cylindrical columns for passing therethrough a specific one of main cables is located at a position on the at least one cable entry end without the possibility of interfering a passage of the specific main cable into the cable splice box after the optical fiber collection plate support has mounted thereon a maximum number of optical fiber collection plates.

4. The cable splice box as claimed in claim 3, wherein a specific one of the plural hollow cylindrical columns for passing therethrough a branching cable is located at a position on the at least one cable entry end without the possibility of interfering a passage of the specific branching cable into the cable splice box after the optical fiber collection plate support has mounted thereon a maximum number of optical fiber collection plates.

5. The cable splice box as claimed in claim 3 further comprising at least two elastic rubber shrinkable tubes for waterproofing the cables passing the cable splice box via the at least one cable entry end.

6. The cable splice box as claimed in claim 3, further comprising at least one of the heat shrink tube for waterproofing the cables passing the cable splice box via the at least one cable entry end.

7. The cable splice box as claimed in claim 4 further comprising at least one cable securing device configured on an exterior of the cable splice box, and having:
   a first securing portion secured to the cable splice box; and
   a second securing portion connected to the first securing portion for securing a cable introduced into the cable splice box to be waterproofed by one of the heat shrink tube and the elastic rubber shrinkable pipe.

8. The cable splice box as claimed in claim 7, wherein the first securing portion is embedded in the at least one cable entry end of the cable splice box.

9. The cable splice box as claimed in claim 7, wherein the first securing portion is one-piece formed on the at least one cable entry end of the cable splice box.

10. The cable splice box as claimed in claim 7, wherein the first securing portion and the at least one cable entry end of the cable splice box are secured together through one selected from a group consisting of a screw splice, a mortise joint, a clamp joint, a ring fastener, a band fastener and a combination thereof.

11. The cable splice box as claimed in claim 7, wherein the second securing portion and the cable are secured together through one selected from a group consisting of a clamp joint, a ring fastener, a band fastener and a combination thereof.

12. The cable splice box as claimed in claim 7 further comprising a supporting portion for connecting the first securing portion and the second securing portion.

13. The cable splice box as claimed in claim 12, wherein the second securing portion is one-piece formed with the supporting portion.

14. The cable splice box as claimed in claim 12, wherein the second securing portion is mechanically connected to and secured to the supporting portion.

15. The cable splice box as claimed in claim 12, wherein the first securing portion is one-piece formed with the supporting portion.

16. The cable splice box as claimed in claim 12, wherein the first securing portion is mechanically connected to and secured to the supporting portion.

17. The cable splice box as claimed in claim 12, wherein the supporting portion is connected to and secured to the first securing portion, and the supporting portion is secured to the cable splice box.

18. The cable splice box as claimed in claim 12, wherein the material of the supporting portion is one selected from a group consisting of a metal, a plastic, and a combination thereof.

19. A cable splice box, comprising:
   a protective cover; and
   at least one cable entry end, each of which has:
   at least one hollow cylindrical column allowing passage of two main cables to be waterproofed in a first type of treatment; and
   at least two hollow cylindrical columns, each of which allows passage of another main cable to be waterproofed in a second type of treatment.

20. A cable splice box comprising a cable entry end having:
   a first hollow cylindrical column allows passage of a first main cable to be waterproofed in a first type of treatment; and
   a second hollow cylindrical column allows passage of a bent second main cable to be waterproofed in a second type of treatment.

21. The cable splice box as claimed in claim 20, wherein the first type and the second type of treatments are the same.

\* \* \* \* \*